This invention pertains to the surface treatment of film, and more particularly to the flame treatment of the surface of polyvinyl fluoride film whereby to enhance the adherability characteristics of said surface.

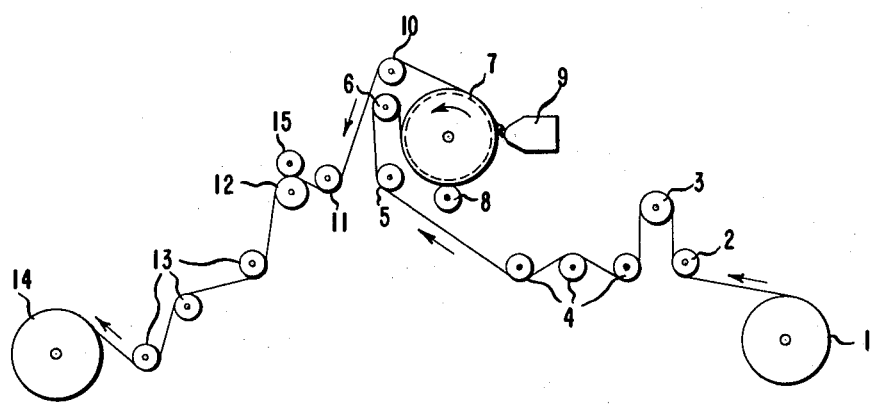
INVENTORS
WILLIAM LOCKE BRYAN
DONALD EUGENE SWARTS
ATTORNEY 3,153,683
FLAME TREATMENT OF POLYVINYL
FLUORIDE FILM
William Locke Bryan, Tonawanda, and Donald Eugene Swarts, Grand Island, N.Y., assignors to E. I. du Pont de Nemours and Company, Wilmington, Del., a corporation of Delaware
Filed July 18, 1962, Ser. No. 210,789
3 Claims. (Cl. 264—80)

Polyvinyl fluoride is noted for its attractive properties, and in film form possesses an unusual combination of excellent resistance to outdoor weathering exposures, a high degree of physical toughness, chemical inertness, abrasion resistance, resistance to soiling and the action of solvents as well as an amazing retention of these properties at both low and elevated temperatures. The above combination of properties not only suggests many areas of use for polyvinyl fluoride in the form of self-supporting films, but also the use of such films as the outer layers of a wide variety of laminar structures destined chiefly for outdoor use wherein the polyvinyl fluoride films serve to upgrade less functional substrates, imparting to the final structure a degree of utility not to be found solely in either film or substrate.

The use of pigmented and unpigmented polyvinyl fluoride films, as components of laminar structures employed as prefinished building siding and roofing in domestic, commercial and industrial installations requires that a strong, durable, hydrolytically stable bond be established between the polyvinyl fluoride film and the substrate, particularly a bond which will not be less durable than the film itself. Substrates with which polyvinyl fluoride films may be combined include those which are commonly employed in residential, commercial and industrial building construction among which may be mentioned plywood, grainless ligneous hardboards, natural woods, asbestos-cement boards and asphalt-impregnated cellulosic boards as well as metal substrates such as aluminum, cold rolled steel, galvanized and aluminized steels. However, polyvinyl fluoride films, and particularly biaxially oriented polyvinyl fluoride films, are noted for being extremely difficult to adhere to other materials, even with adhesive systems which would be classified as functionally acceptable in every other respect from the standpoint of the commercial use of the laminar construction.

It is therefore an object of this invention to provide a process for the surface treatment of polyvinyl fluoride film which will render said films adherable through a suitable adhesive interlayer to a wide variety of both porous and non-porous substrates. The foregoing and related objects will more clearly appear from the description which follows.

These objects are realized by the present invention which, briefly stated, comprises, in combination, the sequential steps of: (1) bringing a surface of polyvinyl fluoride film continuously into intimate contact with a moving, relatively highly thermally conductive surface maintained at a temperature effective to bring the film passing thereover to a bulk temperature within the range of from 70° C. to 135° C.; (2) passing said film while in contact with said surface through the stable, self-sustaining flame of a burner disposed parallel to said film and transversely of the direction of travel thereof, said burner being supplied with a gaseous mixture consisting essentially of a hydrocarbon fuel, oxygen and nitrogen, said fuel being selected from the group consisting of paraffinic and olefinic hydrocarbons, the fuel equivalence ratio of said gaseous mixture ranging from 0.85 to 1.05, the oxygen ratio of said gaseous mixture ranging from 0.21 to 0.35, the distance from the surface of the film to the discharge opening of said burner being less than the length of the unimpeded primary envelope of said flame but not less than the distance below which the velocity of the burning gases escaping from the immediate vicinity of said discharge opening exceeds the burning velocity of said flame, said thermally conductive surface opposite the flame being maintained at said temperature within the range of from 70° C. to 135° C., the exposure of the film to the action of said flame being for a time between 0.001 second and 0.5 second; and (3) maintaining said film in contact with said moving thermally conductive surface for a time after passage of said film through said flame, whereby to lower the contact angle of the treated surface of said film to a value below about 40°.

The expression "fuel equivalence ratio," employed herein in defining the gaseous mixture supplied to the burner, is the ratio of the amount of hydrocarbon fuel present in the gaseous mixture supplied to the burner to the amount of hydrocarbon fuel necessary for complete stoichiometric combustion. The term "stoichiometric" characterizes a proportion of substances (or energy) exactly right for a specific chemical reaction with no excess of any reactant or product.

The expression "oxygen ratio" is the ratio of the total amount of oxygen present in the gaseous mixture supplied to the burner to the total amount of non-fuel components in the mixture, said components including chiefly oxygen and nitrogen.

The "primary envelope" of a stable, self-sustaining flame used in carrying out the process of this invention is readily discerned as the luminous, pale blue inner portion of the flame nearer the discharge opening of the burner (roughly conical in shape for a circular discharge opening and wedge-shaped for a rectangular discharge opening) and is readily distinguished from the fainter, less luminous secondary sheath or envelope surrounding it. By "the length of the unimpeded primary envelope" is meant the distance from the discharge opening of the burner to the tip of the primary envelope of the flame when the burner is so positioned that the flame burns freely and the primary envelope is not distorted by impingement on any surface or by the proximate passage of any surface.

In order to reduce the contact angle of the surface of polyvinyl fluoride films and thus render such films adherable through suitable adhesive interlayers to a wide variety of substrates with a degree of adherability highly resistant to hydrolytic attack, it has been found necessary to raise the bulk temperature of the film to within a specific range prior to subjecting the film to the action of a stable, self-sustaining flame. Further, it has been unexpectedly discovered that not just any flame will do. The flame must be one supported by a gaseous mixture of a hydrocarbon fuel (preferably selected from normally gaseous paraffins and olefins), oxygen and nitrogen, ranging from the lean side of stoichiometric to slightly on the rich side thereof from the fuel standpoint and wherein the oxygen content bears a definite relationship to the total of the non-fuel components of the gaseous mixture or, in other words, to the total of oxygen plus nitrogen. It has further been found necessary to pass the film in such proximity to the burner that the distance from the surface of the film to the discharge opening of the burner is less than the length of the unimpeded primary envelope of the flame but not less than the distance below which the velocity of the burning gases escaping from the immediate vicinity of the discharge opening exceeds the burning velocity of the flame.

By definition, at each point in the burning primary envelope of a stable, self-sustaining flame, the burning velocity normal to the envelope equals the component of gas supply flow normal to the envelope at the same point. When this equilibrium is upset, an unstable flame results. For example, if the supply rate exceeds the burning velocity of the particular gaseous mixture being employed, the flame will lift off the burner and if the supply rate goes still higher, the flame may "blow off" entirely. The great volumetric expansion occuring in the vicinity of the primary envelope of any flame, occasioned chiefly by the rapid and relatively large increase in temperature, increases the velocity of the gases escaping from the immediate vicinity of the discharge opening of the burner. As the film is brought gradually nearer to the discharge opening, some point of approach will be reached for every stable flame where the escape routes defined between film and burner will be so restricted that the gaseous escape velocity may exceed the burning velocity of the supplied mixture. This is called the "flutter point" and must be avoided if a successful treatment is to be effected.

Propane is the preferred hydrocarbon fuel for carrying out the process of this invention from the combined standpoints of cost, availability and ease of both storage and use. Pure propane is logically preferred from the standpoint of uniformity of fuel supply. However, commercial propanes, known to contain substantial quantities of propylene or ethane and mixed butanes, depending on the source, have been employed routinely. Other normally gaseous paraffinic and olefinic hydrocarbons and mixtures thereof have likewise been successfully employed.

A critical factor in carrying out the process of this invention is that it is necessary to maintain the fuel equivalence ratio of the gaseous mixture supplied to the burner within narrow limits ranging from the lean side of stoichiometric to slightly on the rich side of stoichiometric. Specifically, the fuel equivalence ratio may range from 0.85 to 1.05. Simultaneously the oxygen ratio of the non-fuel components of the gaseous mixture must also be maintained within relatively narrow limits. Specifically, the oxygen ratio may range from 0.21 to 0.35. At oxygen ratios much above about 0.35, a practical limitation exists in that local overheating may damage the burner and the chance of explosive flash back is greatly increased. Preferably, the process of this invention is carried out while maintaining the fuel equivalence ratio in the range of 0.90 to 1.00 and the oxygen ratio in the range of 0.25 to 0.29.

A further critical factor in the process of this invention is that the bulk temperature of the film must be raised to within a specific range, i.e., from about 70° C. to about 135° C. prior to passing through the flame. When the temperature rises much above about 135° C., film shrinkage occurs to such an extent that the physical properties of the treated film are adversely affected.

For maximum effectiveness of treatment it is preferred that the time of passage of the film through the flame be at least about 0.001 second and preferably in the range of 0.0025 second to 0.050 second. Successful treatments have been carried out with times of passage of the film through the flame of up to 0.5 second.

Polyvinyl fluoride films which are to be treated by the process of this invention can be manufactured by a variety of methods. A particularly useful and preferred method for making polyvinyl fluoride films consists of the steps of feeding a latent solvent/particulate polyvinyl fluoride mixture to a heated extruder which is connected to a slotted casting hopper, from whence, a tough, coalesced solvent-containing polyvinyl fluoride film is continuously extruded. This latent solvent-containing film is then stretched longitudinally over heated rolls and then transversely in a tenter frame, in which it is held in restraint while the remaining latent solvent is volatilized. These extrusion and stretching procedures are described in detail in U.S. Patent 2,953,818. If desired, various color and/or opacity effects can be achieved by incorporating suitable pigments in the polyvinyl fluoride/latent solvent mixtures being fed to the extruder. Polyvinyl fluoride films containing ultraviolet light screening agents such as polymeric ortho-hydroxy-benzophenones have been found particularly useful where the decorative effect of a clear film over a substrate is desired. Polyvinyl fluoride films may also be prepared by casting onto suitably smooth surfaces any of the more fluid latent solvent/particulate polyvinyl fluoride compositions described in U.S. Patents 3,000,843 and 3,000,844 followed by heating to coalesce the polymer particles into a unitary film and subsequently heating to volatilize the remaining latent solvent.

A convenient and efficient arrangement of apparatus with which the process of this invention may be carried out is shown schematically in the single figure of the accompanying drawing. Referring to said figure, polyvinyl fluoride film to be flame treated unwinds under substantially constant tension from supply roll 1 and is conducted through a train of rolls consisting of a metal idler roll 2, a driven rubber-covered tension isolation roll 3 and three more metal idler rolls 4. From there the film passes over rubber-covered idler roll 5 (and optionally also over rubber-covered idler roll 6) whereby it is substantially reverses its direction of travel and is brought into contact with driven thermally conductive (metal) treating back-up roll 7 which is equipped in conventional manner (not shown) for the passage therethrough of heat transfer fluid (usually water). Once in contact with back-up roll 7, the film then passes under idling rubber-covered nipping roll 8 which serves to minimize wrinkling and press out entrapped air which substantially improves the uniformity of contact of the film with back-up roll 7 as it passes burner 9. A burner having a longitudinally disposed rectangular discharge opening defined by adjustable lips is preferred for use in carrying out the process of this invention. After the treated film leaves back-up roll 7 it passes under metal idler roll 11 (or optionally over metal idler roll 10 and under metal idler roll 11 in sequence), then over driven metal tension isolation roll 12 and finally through a train of metal idler rolls 13 to driven wind-up roll 14. Tension isolation roll 12 is equipped for the passage therethrough of coolant (usually water) and idling rubber-covered nipping roll 15 reduces film slippage on roll 12 and insures good heat transfer contact of the film with roll 12. When only idler roll 5 is used in bringing the untreated film initially into contact with back-up roll 7, the treated film may be taken off back-up roll 7 either under idler roll 11 alone or optionally over idler roll 10 and under idler roll 11 in sequence. When idler rolls 5 and 6 are used in sequence in bringing the untreated film into contact with back-up roll 7, the treated film is taken off back-up roll 7 over idler roll 10 and under idler roll 11 in sequence.

It has been found that while many flame treated polyvinyl fluoride films are sufficiently adherable to a variety of adhesives to produce durable laminar constructions with a variety of substrates including plywood, natural woods, grainless hardboards, asphalt-impregnated cellulosic boards and asbestos-cement boards, many of these same films have performed less than completely satisfactorily in laminar constructions with metal substrates such as aluminum, cold rolled steel, galvanized and aluminized steels. In addition to the requirement that these latter laminar constructions be capable of withstanding the ravages of outdoor weathering for extended periods of time, they must also be capable of being post-formed after their manufacture either to increase structural rigidity, to achieve a more decorative appearance or to protect from the ravages of weathering the adhesive interlayer which otherwise would be exposed at any edge of the laminar construction. Inasmuch as aluminum is typical of this family of metal substrates in this regard, laminations of pigmented polyvinyl fluoride films (commercially more important in laminar constructions with metal substrates) to aluminum substrates have been used in evaluating the utility of the invention in accordance with the following procedure:

Each of five 6-inch by 12-inch aluminum panels, 23 mils thick and passivated with an amorphous oxide-chromate coating (Alodine 1200, a proprietary of Amchem Products, Inc., Ambler, Pennsylvania) is coated on one side with a 0.7 mil thick wet layer of a solution of a thermoplastic adhesive known to exhibit a high degree of hydrolytic stability even after postforming of the substrate. The adhesive employed is an ammoniated acrylic interpolymer of n-butyl-methacrylate (64 wt. percent)/methyl methacrylate (32.5 wt. percent)/glycidyl methacrylate (3.5 wt. percent) prepared following in general the procedure of Example 1 of Belgian Patent 610,317. The adhesive is applied from a 25% solution in a mixed solvent consisting of about 65% isopropanol, 24% xylene and 11% toluene. Each thus coated panel is allowed to air dry at room temperature for about 10 minutes during which the bulk of the solvent is volatilized from the adhesive layer. Then each of the five panels is placed in a circulating hot air oven, each oven maintained at a different temperature over the range of 180° C. to 220° C. (i.e., 10° C. increments between oven temperatures) which is the thermal activation range of greatest utility. After a length of time (usually about one minute) sufficient to bring each aluminum panel and adhesive layer up to the oven temperature, each panel is removed from its respective oven and combined with the treated polyvinyl fluoride film by passing the panel lengthwise through a combining nip consisting of two rubber-covered rolls rotating at a nip speed of 100 lineal ft./min. and applying a pressure to the lamination of about 85–90 p.s.i. A 4-inch by 6-inch piece is cut from one end of each lamination and four dimples (located at the corners of a 2-inch by 3-inch rectangle centered in the 4-inch by 6-inch panel) are pressed into the lamination from the aluminum side (i.e., the polyvinyl fluoride film is outermost on the convex side of each dimple) in a die using ¾-inch diameter steel balls under a load which gives the maximum depth of dimple without metal fracture. This depth averages about ¼-inch. Starting at the top center of each of two diagonally opposite dimples of each dimpled panel, two parallel cuts ¹⁄₁₆-inch apart are made in the film with a No. 10 Exacto Knife blade, the cuts penetrating through to the aluminum substrate and extending down the dimple to the inflection boundary between the dimple and the flat portion of the panel. A No. 10 Exacto Knife blade is then used in an attempt to pry up the film strip at its approximate mid-point. If the film strip can be lifted, tweezers are used in an attempt to peel it back. The results are rated as follows:

Dimple Rating:                                Explanation
   5 _____ Cannot lift film or start peel.
   3 _____ Film strip can be lifted and peeled from the dimple over a distance of about half of the cut length of the strip.
   0 _____ Film strip can be lifted and peeled from the dimple past the inflection boundary where the dimple joins the flat surface.

Intermediate ratings are given by interpolation between those indicated above. Evaluating two dimples per panel (for each of five oven temperatures) gives a maximum possible Dimple Rating of 5×2×5=50. Next a 2-inch by 2-inch piece is cut from the 6-inch by 8-inch flat piece remaining from each original panel and immersed in boiling water. At intervals of five minutes, one hour, twelve hours and one week each 2-inch by 2-inch panel is removed from the boiling water and while the panels are still wet, two parallel cuts, 1-inch long and ¹⁄₁₆-inch apart are made in the film with a No. 10 Exacto Knife blade, the cuts penetrating to the aluminum substrate. A No. 10 Exacto Knife blade is then used in an attempt to pry up the film strip at the mid-point of the inch long cut. If the film strip can be lifted, tweezers are used in an attempt to peel it back. The results are rated as follows:

Flat Boil Rating:
   2 _____ Cannot lift film or start peel.
   1 _____ Film strip can be lifted and can be peeled ¼ inch or less before it breaks.
   0 _____ Film strip can be lifted and peeled more than ¼ inch.

Since five panels (representing the five oven temperatures) are evaluated in this manner at each examination interval, the maximum possible Flat Boil Rating at each interval is 2×5=10. The maximum possible Flat Boil Rating at the end of one week's immersion in boiling water would be 10×4=40.

In flame treating polyvinyl fluoride films for use in making laminar constructions with the classes of substrates mentioned above, it has been found that strong, durable, highly hydrolytically stable bonds are effected only when the average contact angle (for water) of the treated polyvinyl fluoride film has been reduced from the range characteristic of untreated film (i.e., 60° to 70°) to below 40°, and preferably below 35°.

The average contact angle for water (the arithmetic average of advancing and receding contact angles) is measured according to the following procedure: Handling the polyvinyl fluoride film only with tweezers, a ½-inch by ½-inch sample is washed briefly (for about 10 seconds) in deionized water and then similarly in methyl ethyl ketone, followed by drying in a circulating air oven for about 10 minutes at 60° C. After exposing the sample to a radioactive static eliminator and brushing off any dust with a small camel's hair brush, it is placed in the center of the specimen platform (a "Lucite" acrylic resin block) of the contact angle goniometer. This instrument consists chiefly of a microscope mounted with its axis horizontal, equipped with a mechanical stage (the specimen block) that can be raised and lowered or moved from side to side. The normal eyepiece of the microscope is replaced with a protractor eyepiece which is divided into degrees on a rotating scale with a vernier in minutes on a fixed arm. The cross hairs in the eyepiece divide the field of view into quadrants. A drop of deionized water is pushed onto the film surface from a capillary dropper mounted above the stage. The capillary dropper is made from an ordinary eye dropper by drawing the tip into a 1-inch long capillary with a diameter just small enough to prevent water from running out of the tube under gravitational force only. To assist in dispensing liquid from the dropper, the tip of the capillary is ground to about 30° off the perpendicular. The protractor scale is then revolved until its cross hair is parallel to the surface on which the drop is resting. The other cross hair is adjusted until it is tangent to the drop at the point of contact with the surface on which it is resting. The angle between the cross hairs (inside the drop) is read from the protractor scale. This is the advancing contact angle. Using the capillary dropper, water is subtracted from the drop on the film sample and the receding contact angle is recorded. For both advancing and receding contact angles, the drop perimeter must move and, to insure this, the drop is viewed as water is being added or subtracted. Due to water evaporation, an advancing water drop will begin to recede within about 30 seconds after it has stopped advancing. Therefore, the advancing contact angle must be measured soon after the drop perimeter has stopped moving. A receding drop may take as much as 30 seconds to come to equilibrium after subtraction of water has stopped. Since water evaporation merely causes more water loss and does not affect the receding contact angle, it is best to wait about 30 seconds before taking this reading.

The illustrative examples which follow, presented in tubular form, were carried out on the equipment schematically shown in the accompanying drawing using a 53-inch long burner having an elongated rectangular discharge opening. The pigmented white films contained at least 15% by weight of rutile titania, while for colors other than white, the films contained from 4% to 11% by weight of rutile titania and additionally from 8% to 1% by weight of other coloration pigments. Biaxially oriented polyvinyl fluoride films, preferred for their greater physical toughness, were employed throughout the examples. The film path through the apparatus using rolls 5, 6, 7, 10 and 11 in sequence has been designated "upper" while the path using rolls 5, 7 and 11 in sequence has been designated "lower."

*Table I*

| Examples | 1 | 2 | 3 | 4 | 5 | 6 |
|---|---|---|---|---|---|---|
| Film Description | NP | NP | White | White | White | White. |
| Thickness, mils | 0.5 | 4.0 | 1.0 | 2.0 | 2.0 | 2.0. |
| Hydrocarbon Fuel | Propane [1] | Propane [2] | Methane | Propane [2] | Propane [2] | Propane.[2] |
| Fuel Equivalence Ratio | 0.95 | 0.90 | 1.00 | 1.00 | 1.00 | 1.00. |
| Oxygen Ratio | 0.278 | 0.23 | 0.297 | 0.278 | 0.30 | 0.25. |
| Burner Lip Opening, mils | 150 | 100 | 100 | 100 | 100 | 100. |
| Total Gas Rate, S.C.F./M | 22 | 11.8 | 15.5 | 15.6 | 16.2 | 15.2. |
| Film Speed, ft./min | 600 | 30 | 300 | 150 | 150 | 150. |
| Residence Time in Flame, sec | 0.003 | 0.125 | 0.004 | 0.008 | 0.008 | 0.008. |
| Length of Unimpeded Primary Envelope, mm | 3.8 | 4.0 | 3.4 | 3.6 | 3.2 | 3.8 |
| Back-up Roll Water Temp., °C. in/out | 90/91 | 70/73 | 105/105 | 115/116 | 115/116 | 115/115. |
| Film Path Through Apparatus | Lower | Lower | Lower | Lower | Lower | Lower. |
| Film-to-burner Distance, mm | 3.1 | 3.5 | 2.4 | 2.2 | 2.0 | 2.5. |
| Evaluation: | | | | | | |
| Avg. Contact Angle, Degrees | 35 | 29 | 33 | 31 | 28 | 34. |
| Dimple Rating* | | | 28 | 48 | 36 | 33. |
| Flat Boil Rating** | | | 18 | 35 | 27 | 24. |

*Cumulative; maximum possible=50.
**Cumulative; maximum possible at one week=40.
NP=Non-pigmented.
[1] C.P. Propane.
[2] "Pyrofax" brand propane; natural gas derivative; (Linde Co.), 96.5% propane, 2.5% ethane and 1.0% butanes.
[3] "Propane" brand propane; petroleum derivative; (Propane Corp.), 93% propane and 7% propylene.
S.C.F./M.=standard cubic feet/minute.

*Table II*

| Examples | 7 | 8 | 9 | 10 | 11 | 12 |
|---|---|---|---|---|---|---|
| Film Description | Gray | Green | White | White | White | White. |
| Thickness, mils | 1.5 | 1.5 | 1.5 | 1.5 | 1.5 | 2.0. |
| Hydrocarbon Fuel | Propane [1] | Ethylene | Propylene | Methane | Propane [3] | Propane.[3] |
| Fuel Equivalence Ratio | 1.05 | 1.00 | 1.00 | 1.00 | 0.85 | 1.00. |
| Oxygen Ratio | 0.278 | 0.21 | 0.278 | 0.297 | 0.25 | 0.265. |
| Burner Lip Opening, mils | 100 | 100 | 100 | 100 | 200 | 100. |
| Total Gas Rate, S.C.F./M | 15.6 | 15.6 | 15.6 | 15.6 | 24 | 15.4. |
| Film Speed, ft./min | 200 | 75 | 200 | 150 | 300 | 300. |
| Residence Time in Flame, sec | 0.012 | 0.033 | 0.012 | 0.017 | 0.017 | 0.033. |
| Length of Unimpeded Primary Envelope, mm | 3.5 | 3.7 | 3.5 | 3.4 | 3.9 | 3.7. |
| Back-up Roll Water Temp., °C. in/out | 125/124 | 119/123 | 115/114 | 110/110 | 120/119 | 120/117. |
| Film Path Through Apparatus | Upper | Upper | Upper | Upper | Upper | Lower. |
| Film-to-burner Distance, mm | 2.3 | 2.7 | 2.4 | 2.4 | 2.9 | 2.4. |
| Evaluation: | | | | | | |
| Avg. Contact Angle, degrees | 32 | 35 | 36 | 33 | 37 | 34. |
| Dimple Rating* | 50 | 45 | 47 | 40 | 30 | 35. |
| Flat Boil Rating** | 38 | 45 | 35 | 36 | 26 | 29. |

*Cumulative; maximum possible=50.
**Cumulative; maximum possible at one week=40.
See footnotes 1, 2, 3, Table I.

*Table III*

| Controls | A | B | C | D | E |
|---|---|---|---|---|---|
| Film Description | White | White | White | White | White. |
| Thickness, mils | 2.0 | 2.0 | 2.0 | 4.0 | 4.0 |
| Hydrocarbon Fuel | Propane [2] | Propane [2] | Propane [2] | Propane [2] | Propane.[2] |
| Fuel Equivalence Ratio | 1.00 | 1.00 | 0.80 | 1.10 | 1.05. |
| Oxygen Ratio | 0.278 | 0.278 | 0.23 | 0.21 | 0.20. |
| Burner Lip Opening, mils | 100 | 100 | 50 | 100 | 100. |
| Total Gas Rate, S.C.F./M | 15.6 | 15.6 | 6.4 | 9.2 | 9.0. |
| Film Speed, ft./min | 150 | 300 | 250 | 300 | 300. |
| Residence Time in Flame, sec | 0.008 | 0.004 | 0.0024 | 0.004 | 0.004. |
| Length of Unimpeded Primary Envelope, mm | 3.6 | 3.6 | 3.3 | 3.5 | 3.9 |
| Backup Roll Water Temp., °C. in/out | 115/116 | 55/56 | 110/110 | 70/71 | 80/81. |
| Film Path Through Apparatus | Lower | Lower | Lower | Lower | Lower. |
| Film-to-burner Distance, mm | 4.6 | 2.8 | 3.0 | 3.2 | 3.5. |
| Evaluation: | | | | | |
| Avg. Contact Angle, degrees | 41 | 40 | 41 | 43 | 42. |
| Dimple Rating* | 19 | 21 | 18 | 13 | 11. |
| Flat Boil Rating** | 13 | 12 | 10 | 6 | 4. |

*Cumulative; maximum possible=50.
**Cumulative; maximum possible at one week=40.
See footnotes 1, 2, 3, Table I.

We claim:

1. A process for rendering the surface of polyvinyl fluoride film adherent to other materials comprising, in combination, the sequential steps of: (1) bringing a surface of polyvinyl fluoride film continuously into intimate contact with a moving, relatively highly thermally conductive surface maintained at a temperature effective to bring the film passing thereover to a bulk temperature within the range of from 70° C. to 135° C.; (2) passing said film while in contact with said surface through the stable, self-sustaining flame of a burner disposed parallel to said film and transversely of the direction of travel thereof, said burner being supplied with a gaseous mixture consisting essentially of a hydrocarbon fuel, oxygen and nitrogen, said fuel being selected from the group consisting of paraffinic and olefinic hydrocarbons, the fuel equivalence ratio of said gaseous mixture ranging from 0.85 to 1.05, the oxygen ratio of said gaseous mixture ranging from 0.21 to 0.35, the distance from the surface of the film to the discharge opening of said burner being less than the length of the unimpeded primary envelop of said flame but not less than the distance below which the velocity of the burning gases escaping from the immediate vicinity of said discharge opening exceeds the burning velocity of said flame, said thermally conductive surface opposite the flame being maintained at said temperature within the range of from 70° C. to 135° C., the exposure of the film to the action of said flame being for a time between 0.001 second and 0.5 second; and (3) maintaining said film in contact with said moving thermally conductive surface for a time after passage of said film through said flame, whereby to lower the contact angle of the treated surface of said film to a value below about 40°.

2. The process of claim 1 wherein the polyvinyl fluoride film is biaxially oriented polyvinyl fluoride film.

3. The process of claim 1 wherein the fuel equivalence ratio is in the range of 0.90 to 1.00 and the oxygen ratio is in the range of 0.25 to 0.29.

References Cited in the file of this patent

UNITED STATES PATENTS

| 2,648,097 | Kritchever | Aug. 11, 1953 |
| 2,683,894 | Kritchever | July 20, 1954 |
| 2,795,820 | Grow et al. | June 18, 1957 |